US011041517B2

(12) United States Patent
Bentsen

(10) Patent No.: US 11,041,517 B2
(45) Date of Patent: Jun. 22, 2021

(54) NET ASSEMBLY

(71) Applicant: KOMPAN A/S, Odense SØ (DK)

(72) Inventor: Nikolaj Maj Bentsen, Vejle Ø (DK)

(73) Assignee: KOMPAN A/S, Odense SØ (DK)

( * ) Notice: Subject to any disclaimer, the term of this patent is extended or adjusted under 35 U.S.C. 154(b) by 485 days.

(21) Appl. No.: 15/966,365

(22) Filed: Apr. 30, 2018

(65) Prior Publication Data
US 2018/0313382 A1 Nov. 1, 2018

(30) Foreign Application Priority Data

May 1, 2017 (DK) .............................. PA201770290

(51) Int. Cl.
*A63G 9/00* (2006.01)
*F16B 7/04* (2006.01)
(Continued)

(52) U.S. Cl.
CPC .............. *F16B 7/0433* (2013.01); *A63G 9/00* (2013.01); *F16G 11/048* (2013.01); *F16G 11/06* (2013.01)

(58) Field of Classification Search
CPC .......... A63G 9/00; A63G 13/00; A63G 13/02; A47D 13/086; A47D 13/105;
(Continued)

(56) References Cited

U.S. PATENT DOCUMENTS 2,860,689 A * 11/1958 Baker .................. A47D 13/105
472/118
4,771,516 A 9/1988 Foth
(Continued)

FOREIGN PATENT DOCUMENTS

CH 701337 A2 12/2010
CN 2369710 Y 3/2000
(Continued)

OTHER PUBLICATIONS

Extended European Search Report dated Sep. 19, 2018 in European Application No. 18170017.0 (8 pages).
(Continued)

*Primary Examiner* — Kien T Nguyen
(74) *Attorney, Agent, or Firm* — Bookoff McAndrews, PLLC

(57) ABSTRACT

A net assembly comprising a) a first elongated member, b) a second elongated flexible member, c) a third elongated flexible member, d) a first connector, and e) a second connector, f) said first connector connecting the first elongated member and second elongated flexible member, g) said second connector connecting the second and third elongated flexible members, h) said first connector having a first end and a second end, said first end being connected to the first elongated member and said second end being connected to the second elongated flexible member, i) said second connector having a first end and a second end, said first end being connected to the second elongated flexible member and the second end being connected to the third elongated flexible member, and j) said first and/or said second end of said first and second connectors comprising a longitudinal displacement preventing element.

13 Claims, 7 Drawing Sheets

(51) Int. Cl.
*F16G 11/04* (2006.01)
*F16G 11/06* (2006.01)

(58) Field of Classification Search
CPC ..... A47D 13/107; A47D 13/10; F16G 11/025; F16G 11/044; F16G 11/14; F16B 7/0433
USPC ............ 472/118–124; 24/115 R, 115 H, 459; 403/391, 396
See application file for complete search history.

(56) References Cited

U.S. PATENT DOCUMENTS

| | | | |
|---|---|---|---|
| 5,177,926 A | | 1/1993 | Frankel |
| 6,475,117 B1 | | 11/2002 | Berglund et al. |
| 6,618,910 B1 | | 9/2003 | Pontaoe |
| D702,449 S | | 4/2014 | Puotiniemi |
| 8,684,458 B2 | * | 4/2014 | Lee ................. A47C 7/407 297/280 |
| D738,637 S | | 9/2015 | Dean |

FOREIGN PATENT DOCUMENTS

| | | |
|---|---|---|
| DE | 258 433 A1 | 7/1988 |
| DE | 20 2010 014 684 U1 | 12/2010 |
| EP | 1 421 977 A1 | 5/2004 |
| FR | 2 971 315 A1 | 8/2012 |
| WO | 98/02675 A1 | 1/1998 |
| WO | 2016/118095 A1 | 7/2016 |

OTHER PUBLICATIONS

RayPerry, "Cantilever Basket Swing," <http://www.rayparry.co.uk/product/cantilever-basket-swing/> electronically retrieved on May 29, 2018, (4 pages).

Danish Search Report completed Oct. 9, 2017, in Danish Patent Application No. 2017 70290 (4 pages).

* cited by examiner

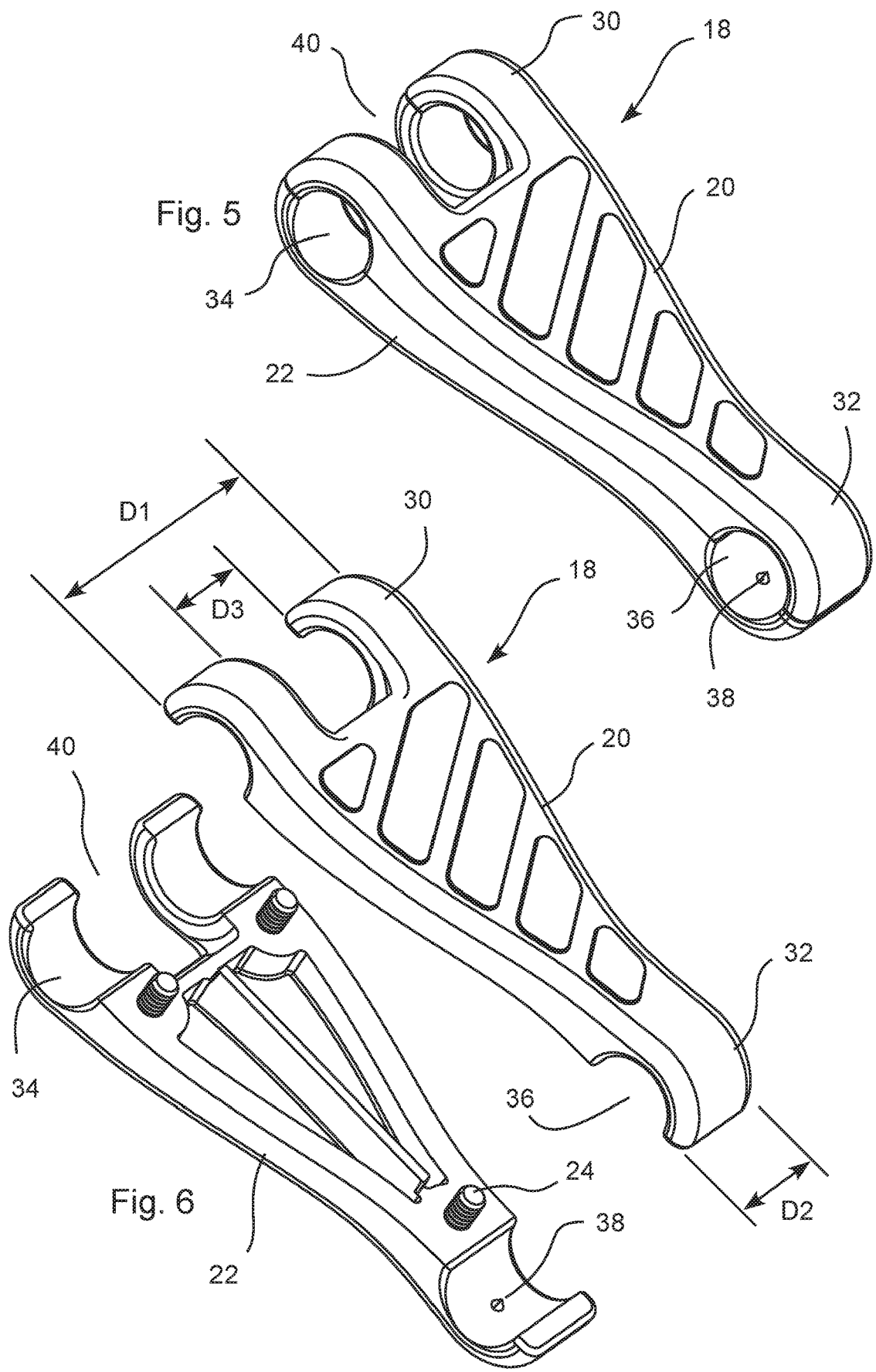

NET ASSEMBLY

CROSS-REFERENCE TO RELATED APPLICATION(S)

This patent application claims benefit under 35 U.S.C. § 119 to Denmark Patent Application No. PA201770290, filed on May 1, 2017, the entirety of which is incorporated herein by reference.

The current invention relates to a net assembly and to a method of assembling a net assembly.

The embodiments described in this specification are mainly related to applications for use in playground equipment, however, other applications could also be imagined.

DESCRIPTION OF RELATED ART

Net assemblies are used in many different well known applications. One example application is a "basket swing". An example of a circular basket swing is shown in USD702449. The net assembly of the swing of USD702449 is not described in detail, however searching on google for the words "basket swing" will disclose a number of circular swings with net assemblies. Basket swings can also be found in shapes other than circular. Sometimes a basket swing can be called a bird nest swing.

Another example of the use of a net assembly in the prior art is for a hammock. Hammocks are typically also formed from a collection of ropes which are assembled into a net structure. Another example of a net assembly in the prior art is a climbing net.

In the prior art, it is common to provide a net assembly by providing a network of ropes which cross each other to provide a grid like structure. Openings are provided in the grid like structure of the net assembly between adjacent ropes.

The ropes are joined together where they cross to ensure that the dimensions of the openings between adjacent ropes do not change. In some cases, the ropes are spliced together where they cross. In other solutions, the ropes are tied together with knots. In other solutions, the ropes are joined together via a clamp at the point of intersection between two ropes.

In order to provide the necessary strength for the net assembly, thick ropes are usually necessary. Furthermore, it is important that the spacing between the adjacent ropes is small enough that a child cannot fit his/her head and/or torso through the openings between the ropes. It is therefore also important that the openings remain their predefined constant size and as such it is very important that the ropes do not displace with respect to each other during use. Hence it is important to make the connections between ropes very strong.

When hammocks and basket swings or other applications of net assemblies are used in playgrounds, there are number of very rigid safety specifications that the net assemblies must meet. Typically, these safety specifications impose the use of a rather strong rope. Often, the ropes comprise a braided steel core coated by a plastic wrap or a plastic braid. When these strong ropes are joined together to form the net assembly, the points of intersections will form large protrusions which make it uncomfortable to lie on. These protrusions are formed by the knots, by the splices, by the clamps, etc. Furthermore, it is rather time consuming to assemble a net assembly where the ropes are spliced or knotted or clamped together.

Other forms of basket swings have been proposed in the prior art to avoid some of the above mentioned problems. One example of such an alternative basket swing is provided in WO16118095. However, such alternative basket swings have other issues.

SUMMARY OF THE INVENTION

A first aspect of the current invention is therefore to provide a net assembly which is more comfortable to rest on.

A second aspect of the current invention is to provide a net assembly which is easy and fast to assemble.

A third aspect of the current invention is to provide a net assembly which is attractive to look at.

These aspects are provided at least in part by a net assembly as defined in claim 1.

According to the current specification the term "elongated member" should be understood as a member having a length which is greater than its width and thickness. Some non-limiting examples of elongated members are a rope, a chain, a pipe, a steel rod, a plastic injection moulded rod and a wire. According to this specification, an elongated flexible member is an elongated member which is flexible, for example a rope, a wire, a chain, etc.

It should be noted that the elongated members do not have to be straight, but could be any suitable form, for example circular, oval, rounded rectangular, etc. In this respect, it should also be noted that in the claims and the description, reference is sometimes made to the longitudinal axis of the elongated element. In the case where elongated element has a curvature, then the longitudinal axis should be interpreted as the average linear axis passing through the portion of the elongated member at the location of interest.

Additional embodiments are disclosed in the dependent claims and in the rest of the description below. Different features of different embodiments discussed in this specification can be joined with each other to provide even more embodiments.

In one embodiment, the first and second connectors are connected to a maximum of two elongated flexible elements each. In this way, short and simple connectors can be provided which only need to extend between two elongated elements. In one embodiment, the connector connects at most two adjacent elongated elements.

In one embodiment, the connectors are formed as injection moulded plastic elements. In one embodiment the connectors are elements having a stiffness which is at least twice that of the elongated flexible elements.

In one embodiment, the net assembly could further comprise a third and a fourth connector similar to the first and second connectors respectively, said third and fourth connector being spaced from said first and second connector in the direction of the longitudinal axis of the elongated flexible elements and being connected to the first elongated element and the second and third elongated flexible elements respectively in a manner similar to the first and second connectors.

In one embodiment, the net assembly could comprise an exposed section of elongated flexible element between the first and the third connectors and between the second and the fourth connectors. In one embodiment, the third and fourth connectors could be arranged such that they are not abutting the first and second connectors. In this way, the number of connectors necessary can be reduced.

In one embodiment, the second end of the connector could comprise the longitudinal displacement preventing element. In one embodiment, the protrusion could be a sharp pin extending in a direction which is perpendicular to the longitudinal axis of the elongated flexible element to which the connector is connected.

In one embodiment, the first end of the connector could comprise a first through going hole which is arranged perpendicular to the longitudinal axis of the connector and the second end of the connector could comprise a second through going hole which is arranged perpendicular to the longitudinal axis of the connector and where the first and second through going holes could be arranged such that the elongated flexible members connected to the first and or second connectors pass through the through going hole. In one embodiment the inner diameter of the first and/or second through going holes could be chosen to be slightly larger than the outer diameter of the elongated flexible member. In one embodiment, a protrusion could be arranged such that it is extending from an inner surface of the first and/or the second through going hole.

In one embodiment, the maximum dimension of the first and second connectors perpendicular to the plane tangent to the net assembly at the location of the connector could be less than 200% of the corresponding dimension of the elongated flexible element. In one embodiment this dimension could be less than 180%, less than 150% or less than 130%. By reducing the thickness of the connectors with respect to the thickness of the elongated flexible elements, the net assembly becomes more comfortable to lie on.

In another embodiment, the maximum width of the connectors could be chosen such that it is greater than 1 cm, greater than 1.5 cm, greater than 2 cm, greater than 3 cm or greater than 4 cm. By increasing the width of the connector, the surface area of the connector is increased thereby making it more comfortable to lie on. In one embodiment the upper and/or lower surfaces of the connector could be formed as essentially planar surfaces. In this way, the connectors become more comfortable to lie on.

In one embodiment, connector could be made up of top and bottom shell portions which are joined together during assembly. In one embodiment the top and bottom shell portions of the connector could be connected via one or more two way barbed element(s). By barbed element should be understood an element having barbs facing one direction on one side and barbs facing another direction on another side. In one embodiment, the top and bottom shell portions could be connected via cooperating snap elements on the top and bottom shell portions. Cooperating snap elements should be understood as two elements which when pressed against each other will engage with each other to hold onto each other.

In one embodiment the net assembly could comprise a bridge connector where the width of the first end and the width of the second end of the bridge connector in a direction parallel to the longitudinal axis of the elongated flexible element to which they are connected is greater than the corresponding dimension of the second end of the first and second connectors and where both the first and the second ends of the bridge connector have openings suitable for inserting the second ends of other connectors.

In one embodiment, the net assembly could further comprise a short connector between two adjacent elongated elements, said short connector being similar to said first and/or said second connector, but having a dimension between the elongated flexible elements to which it is connected which is less than the corresponding dimension of the first and/or second connector.

A method of assembling a net structure according to the invention is disclosed in claim 10. In one embodiment of the method of assembling the net assembly, the method could further comprise the step of providing the bottom and/or the top shell portions of the connectors with one way fastening elements which are suitable to engage with corresponding one way fastening elements on the top and/or bottom shell portions respectively of the connectors.

It should be emphasized that the term "comprises/comprising/comprised of" when used in this specification is taken to specify the presence of stated features, integers, steps or components but does not preclude the presence or addition of one or more other features, integers, steps, components or groups thereof. For example, in the claims it is stated that the net assembly comprises a first connector and a second connector. However, this should be understood in that the net assembly comprises at least two connectors. Any number of connectors could be comprised in a net assembly according to the current invention. The same is true for the number of elongated elements.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

FIG. 5 shows a detailed perspective view of one connector of the net assembly of the basket swing of FIG. 1.

FIG. 6 shows a detailed exploded perspective view of the connector of FIG. 5.

DETAILED DESCRIPTION OF THE EMBODIMENTS

Figure 1:
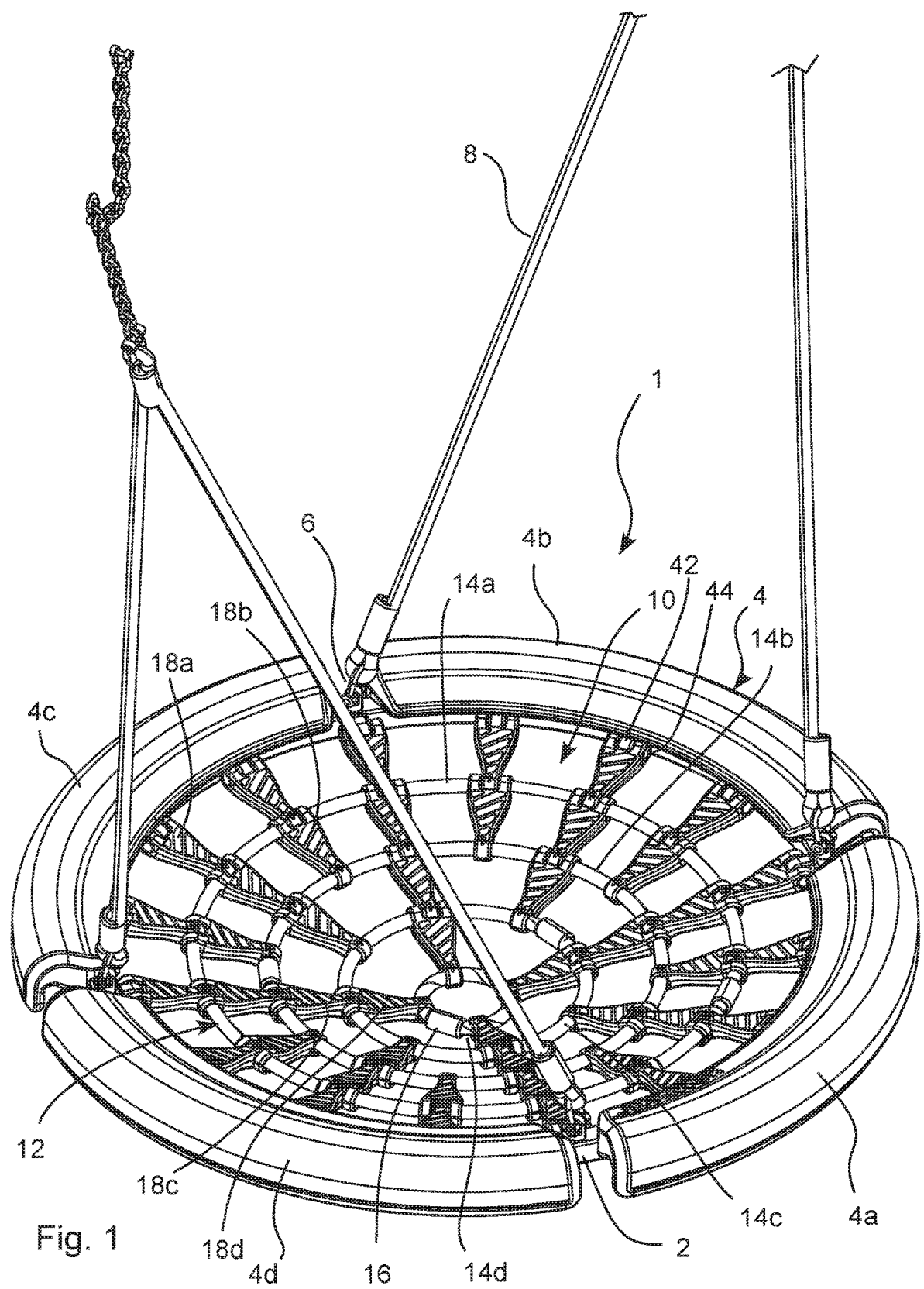
FIG. 1 shows a top perspective view of a basket swing comprising an embodiment of a net assembly according to the current invention.

FIGS. 1-12 all relate to a first embodiment 1 of a basket swing which uses a net assembly according to the current invention. FIG. 1 shows the complete basket swing 1. The basket swing comprises a circular metal frame 2 covered by a rubber bumper 4. The rubber bumper is formed as four quarter circular rubber elements 4a, 4b, 4c, 4d which are mounted on the circular metal frame 2. Support fittings 6 are integrated into the circular frame and the swing is supported by ropes 8 connected to the four support fittings 6.

The circular area 10 inside the circular metal frame 2 is filled with a net assembly 12 according to the invention. The net assembly 12 comprises four co-centric circular elongated flexible elements 14 in the form of four co-centric flexible circular rings 14. In this embodiment, the rings 14 are provided by ropes which are joined together into a ring with a metal connector 16. The four co-centric rings are provided with four different diameters, each being progressively smaller than the last. The spacing between adjacent co-centric circular rings is the same for all four rings. The rings are joined together by connectors 18.

The largest ring 14a is connected by a first series of spaced apart connectors 18a to the circular metal frame 2. The second largest ring 14b is connected to the largest ring 14a via a second series of spaced apart connectors 18b. The third largest ring 14c is connected to the second largest ring 14b via a third series of spaced apart connectors 18c. The smallest ring 14d is connected to the third largest ring via a fourth series of spaced apart connectors 18d. The connectors 18 are all arranged extending along a radial direction with regards to the circular rings. Details of the connectors 18 are provided with regards to FIGS. 2-12. In this embodiment, the connectors of adjacent series of connectors are connected and arranged to form radial lines of connected connectors.

Figure 2:
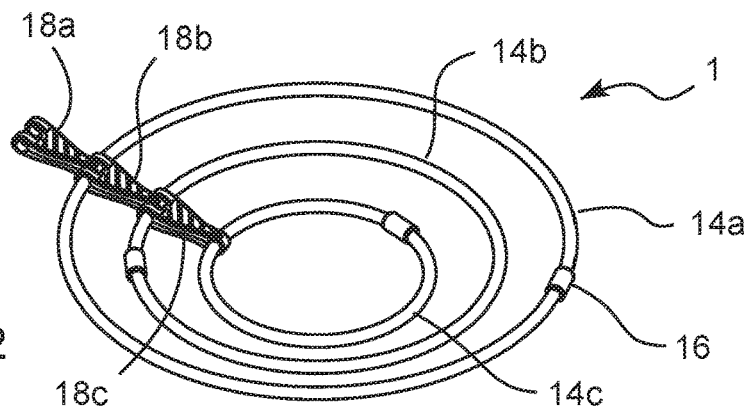
FIG. 2 shows a top perspective view of a portion of the net assembly of the basket swing of FIG. 1.
Figure 3:
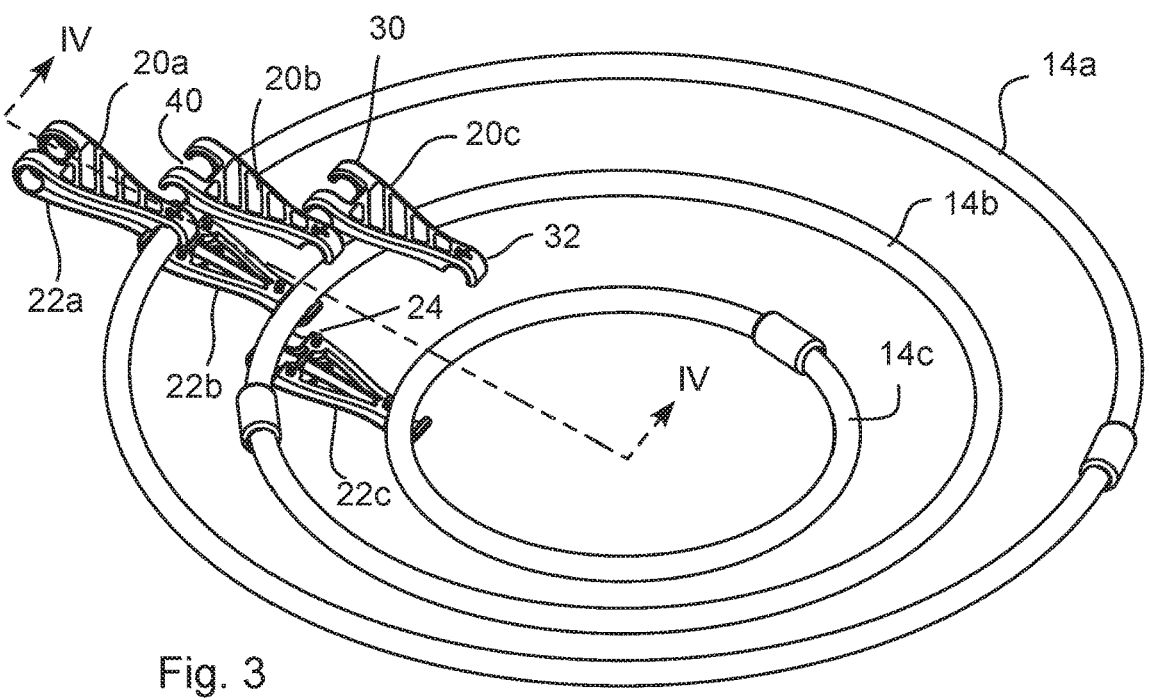
FIG. 3 shows a top perspective exploded view of the portion of the net assembly shown in FIG. 2.
Figure 4:
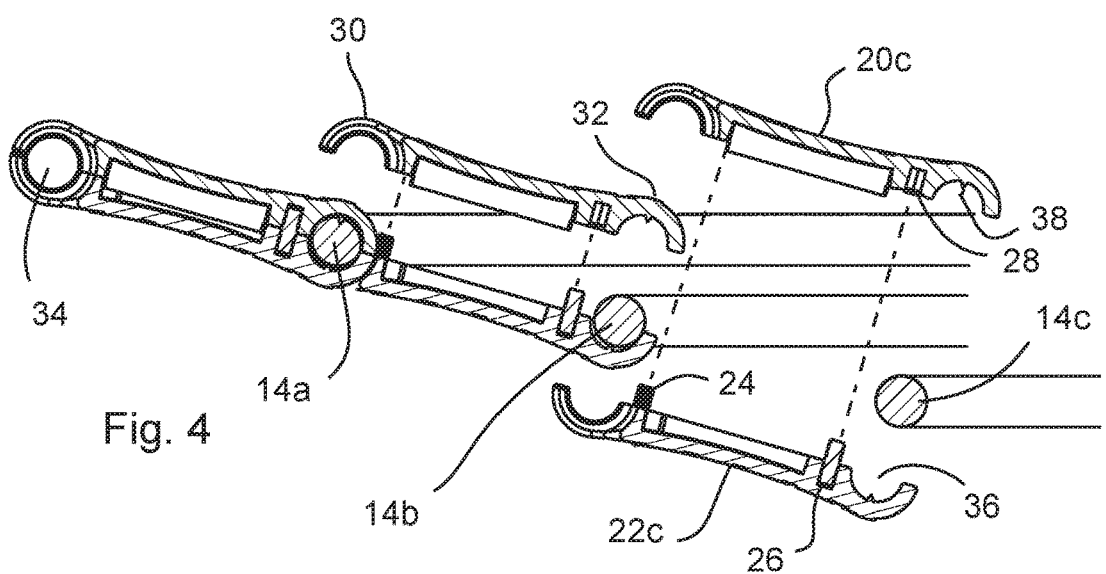
FIG. 4 shows a cross sectional exploded view of a portion of the net assembly of FIG. 2 according to the line defined by IV-IV in FIG. 3.
Figure 7:
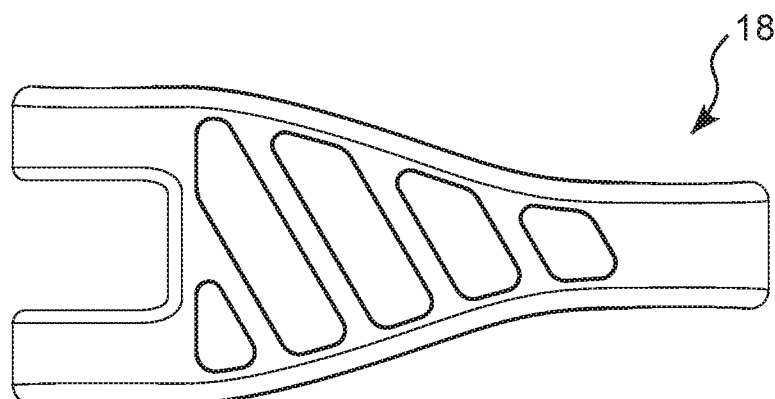
FIG. 7 shows a top view of the connector of FIG. 5.
Figure 8:
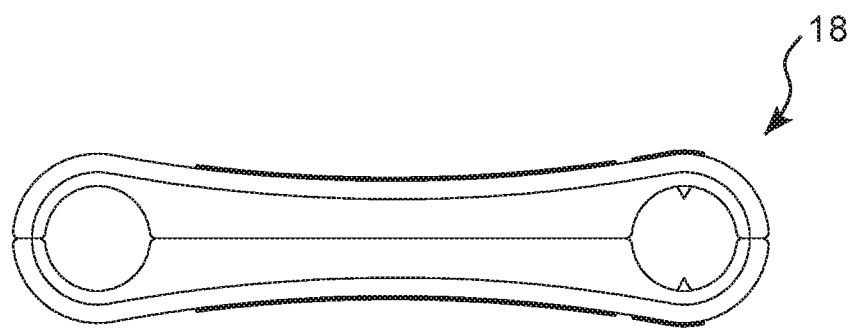
FIG. 8 shows a front view of the connector of FIG. 5.
Figure 9:
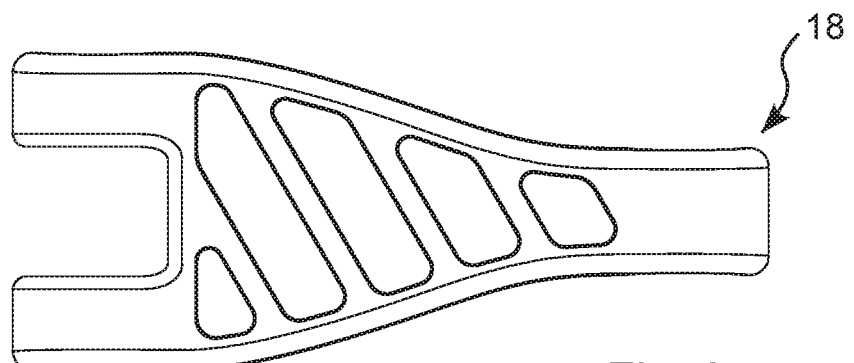
FIG. 9 shows a bottom view of the connector of FIG. 5.
Figure 10:
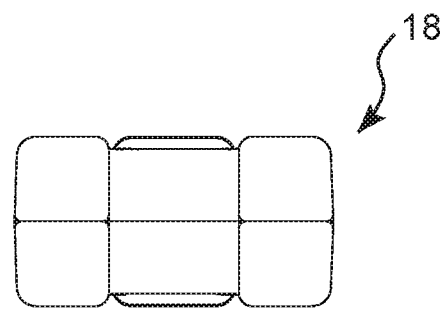
FIG. 10 shows a left side view of the connector of FIG. 5.
Figure 11:
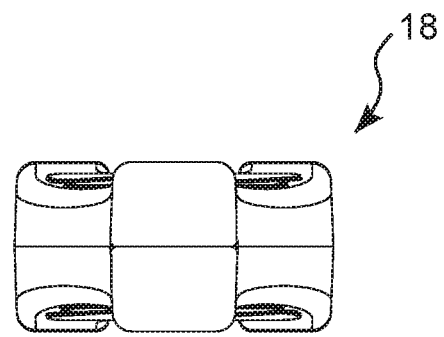
FIG. 11 shows a right side view of the connector of FIG. 5.
Figure 12:
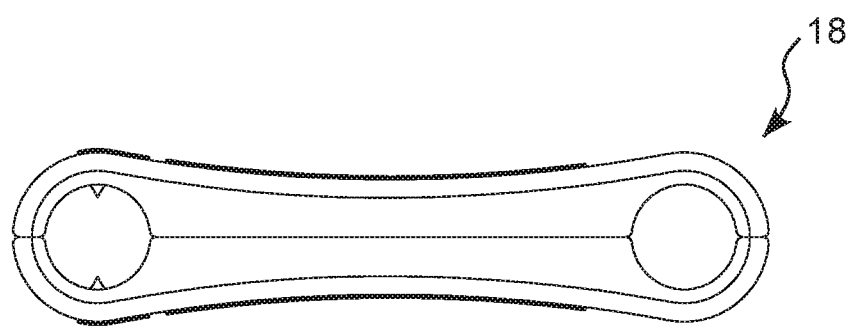
FIG. 12 shows a rear view of the connector of FIG. 5.

FIGS. 2-4 show details of how the net assembly of FIG. 1 is assembled. FIG. 2-4 show three co-centric rings 18a, 18b, 18c equal to the largest, the second largest and the third largest rings of FIG. 1. One connector of the first series of connectors 18a, one connector of the second series of connectors 18b and one connector of the third series of connectors 18c are shown in the figures to simplify the explanation. FIGS. 5 and 6 show a more detailed view of the connector itself and FIGS. 7-12 show a number of different views of the connector. FIGS. 5 and 7-12 could be suitable for use as a design application. It should be noted that the drawings show diagonal surface patterns on the upper and lower surfaces of the connector which could be removed if not desired.

As can be seen from FIGS. 3, 4 and 6, the connector comprises two shell portions, a top shell portion 20 and a bottom shell portion 22 which are held together by three two way barbed pins 24. The pins are inserted into recesses 26 in the bottom shell portion 22 and when the top shell portion 20 is pressed onto the bottom shell portion, the barbed pins 24 are pressed into corresponding recesses 28 in the top shell portion 20. Due to the barbs on the pins, once the top and bottom shell portions are pressed together, they will be held together and it will not be easy to separate the two shell portions.

As can be seen from the figures, the connectors have a first end 30 and a second end 32. A first through going hole 34 is placed in the first end 30 and a second through going hole 36 is placed in the second end 32. The two through going holes 34,36 are arranged perpendicular to the longitudinal axis of the connector. The through going holes are arranged to be slightly larger than the diameter of the rope 14 which is used in the net assembly.

The second end 32 of the connector is provided with a sharp protrusion in the form of a pin 38 in the inside surface of the through going hole in both the top and bottom shell portions. These pins extend radially with respect to the through going hole. When the top and bottom shell portions are pressed together about a rope, the two pins 38 will be pressed into the rope. This will create a significant amount of friction between the rope and the second end of the connector. This will therefore prevent the connector from displacing along the longitudinal axis of the rope with respect to the rope which is connected to the second end of the connector. This will also prevent the connector from pivoting with respect to the rope connected to the second end of the connector and about the longitudinal axis of the rope. In contrast the through going hole in the first end does not have any pins and since it is slightly larger in diameter than the rope, the connector is free to rotate with respect to the rope 14 connected to the first end of the connector and about the longitudinal axis of said rope 14.

The first end 30 has a dimension along a direction which is parallel to the longitudinal axis of the rope 14 and which is shown as D1. The second end 32 has a dimension along a direction which is parallel to the longitudinal axis of the rope 14 and which is shown as D2. The dimension D1 is greater than D2. The first end 30 is also formed with a recess 34 which has a dimension parallel to the longitudinal axis of the rope 14 which is shown as D3. D3 is slightly larger than D2 such that the second end 32 of a first connector 18b can be inserted into the recess 40 in the first end 30 of a second connector 18c. The depth of the recess is such that the through going hole 34 in the second end of the first connector can be aligned with the through going hole 36 in the first end of the second connector.

During assembly, the second end of a first connector is connected to a rope and then the first end of a second connector is connected to the same rope and such that the second end of the first connector is arranged in the recess in the first end of the second connector. Since the second end of the first connector is provided with a pin which engages with the rope, the second end of the first connector is prevented from displacing with respect to the rope. Furthermore, since the second end of the first connector is inserted into the recess in the first end of the second connector, the second connector is also prevented from displacing with respect to the rope. However, the second connector is free to pivot with respect to the rope about the longitudinal axis of the rope. In this way, a pivotable joint is formed between the two connectors while maintaining the position of the connectors on the rope. In this way, a flexible net assembly is provided, while maintaining the dimensions of all the openings in net assembly.

The structure of the disclosed net assembly is also very easy to assemble. In one example embodiment, a suitable form (not shown) is provided which has recesses or suitable holding elements for the bottom shell portions 22 of all the connectors. A user can then insert bottom shell portions into all the available recesses. Once all the bottom shell portions are arranged, circular rope rings can be placed into the form and into the through going openings in the bottom shell portions. Top shell portions can then be placed onto the bottom shell portions. Pressure can be applied to the top shell portions via a common pressure application to all portions at once, or each top shell portion can be pressed into place one at a time. Once the top shell portions have been pressed onto the bottom shell portions, the net assembly is properly assembled.

It can be mentioned that the circular metal frame 2 in the current embodiment, is provided with metal protrusions 42 which extend radially and inwardly from the circular metal frame 2. Metal pins 44 having a diameter which is essentially equivalent to the diameter of the rope, are welded onto the metal protrusions such that they protrude in a direction which is perpendicular to the radial direction. The first end of the first connector can then be fastened directly to the pins 44 during assembly. The metal protrusion 42 is sized to fit in the recess of the first end of the first connector. In this way, the first connector is pivotably connected to the pins of the metal frame while at the same time prevented from displacing with respect to the protrusion. In another embodiment, the circular frame 2 with the protrusions 42 and the pins 44 could be formed as an injection moulded component, where the circular frame, the protrusions and the pins are all formed as a single integrated injection moulded element.

While the above description has described one example embodiment of a basket swing with a net assembly according to the current invention, other forms of net assemblies could also be imagined.

Figure 13:
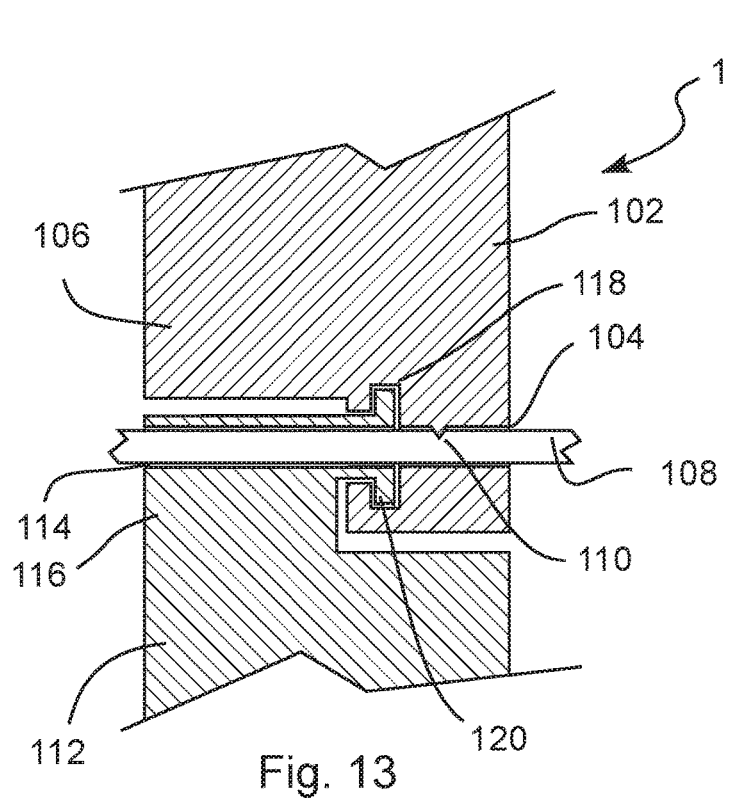
FIG. 13 is a schematic cross sectional view of a portion of another embodiment of a net assembly according to the invention.

FIG. 13 schematically shows a portion of another possible arrangement of a net assembly 100 according to the current invention. A first connector 102 has a through going hole 104 in a first end 106 through which a rope 108 is arranged. A pin 110 is arranged on the inner surface of the through going hole 104. The pin 110 is pressed into the rope to prevent displacement of the first end 106 of the first connector 102 with respect to the rope 108. A second connector 112 has a through going hole 114 in a second end 116 through which the same rope 108 passes. The through going hole 114 in the second end 116 of the second connector 112 does not have a pin and is able to pivot freely with respect to the rope 104.

The first connector is further arranged with a first circular recess 118 which engages with a circular collar like flange 120 of the second connector. The interaction between the collar like flange 120 of the second connector and the recess 118 of the first connector prevents the first and second connectors from displacing with respect to each other along a direction which is parallel to the longitudinal axis of the rope, while still permitting pivot motion between the first and second connectors about the longitudinal axis of the rope. The two connectors could be manufactured as two plastic injection moulded shells which are snapped together to sandwich the rope. Likewise, when snapping two shells together, the collar like flange can be engaged in the recess.

Figure 14:
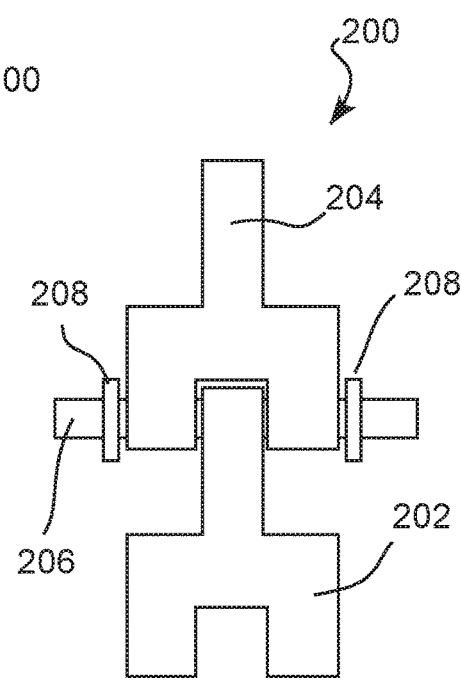
FIG. 14 is a schematic top view of a portion of another embodiment of a net assembly according to the invention.

FIG. 14 shows a schematic embodiment 200 with connectors 202,204 which are very similar to the connectors of the embodiment of FIGS. 1-12. However, in this case, no pins are formed in the through going openings and both the first and the second ends of both the connectors are free to pivot and displace with respect to the rope 206. However, locking rings 208 are placed on the rope on either side of one of the connectors. The locking rings firmly engage with the rope and prevent the connector from displacing with respect to the rope. In this case, the locking rings can be interpreted as a form of displacement preventing element in the understanding of the claims.

Figure 15:
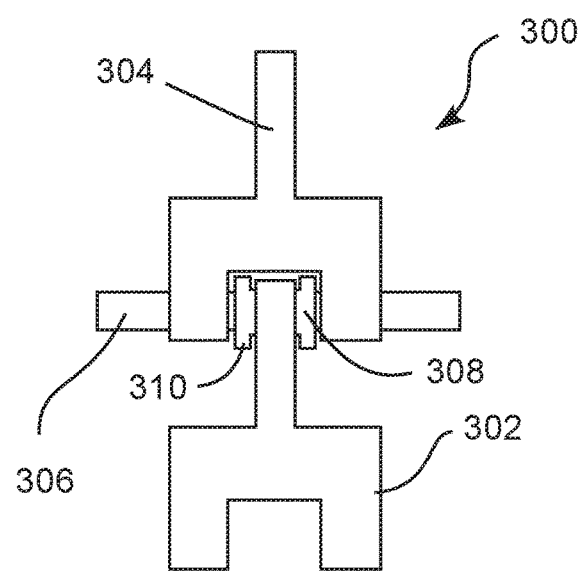
FIG. 15 is a schematic top view of a portion of another embodiment of a net assembly according to the invention.

FIG. 15 shows an embodiment 300 which is very similar to the embodiment shown in FIG. 14, however, instead of locking rings, a locking bushing 308 with two flanges 310 is fastened one the rope 306 at a fixed position. The second end of a first connector 302 is fastened to the bushing and then the first end of a second connector 304 is fastened on either side of the bushing. In this way, both ends of the both connectors are free to pivot with respect to the rope, but both are prevented from displacing with respect to the rope. The bushing could be formed as a plastic injection moulded element comprising two half shells which are pressed together around the rope. Similar to previous embodiments, the bushing could be held in place via a protrusion or pin which presses into the rope.

Figure 16:
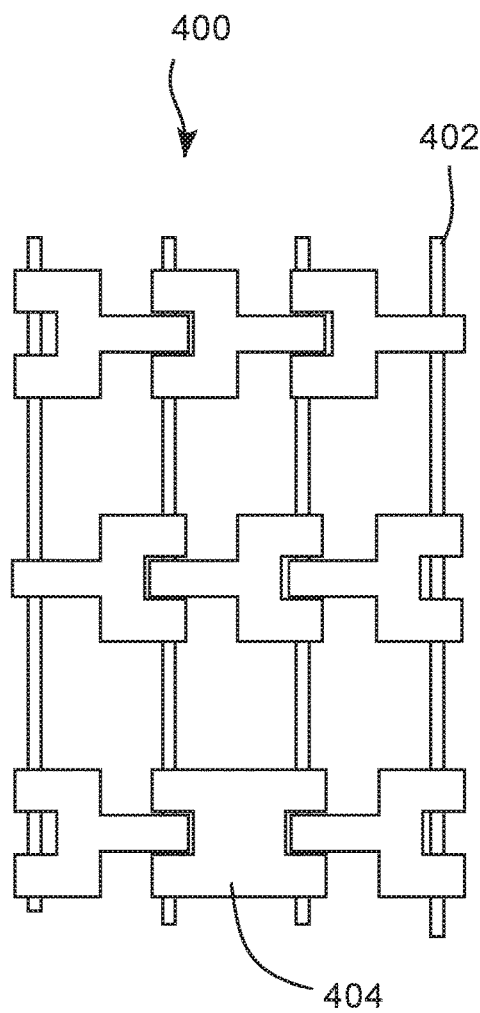
FIG. 16 is a schematic top view of a portion of another embodiment of a net assembly according to the invention.

FIG. 16 schematically shows a portion of an embodiment of a rectangular net assembly 400 according to the current invention. In this case the ropes are provided as parallel ropes 402 and the connectors can be similar to the ones shown in FIGS. 1-12. In the first row, the connectors are arranged with the second end to the right. In the second row, the connectors are arranged with the second end to the left. In the third row, a new type of bridge connector 404 is introduced which has two "first" ends. In this way, the direction of the connectors can be changed. This will in certain cases provide a more symmetric appearance to the net assembly. The three rows are shown for example only. In a real world situation, an assembly could be arranged with all the rows being the same. Likewise, FIG. 16 is only showing a portion of a structure and in a real world application more elongated elements and more connectors could be provided.

Figure 17:
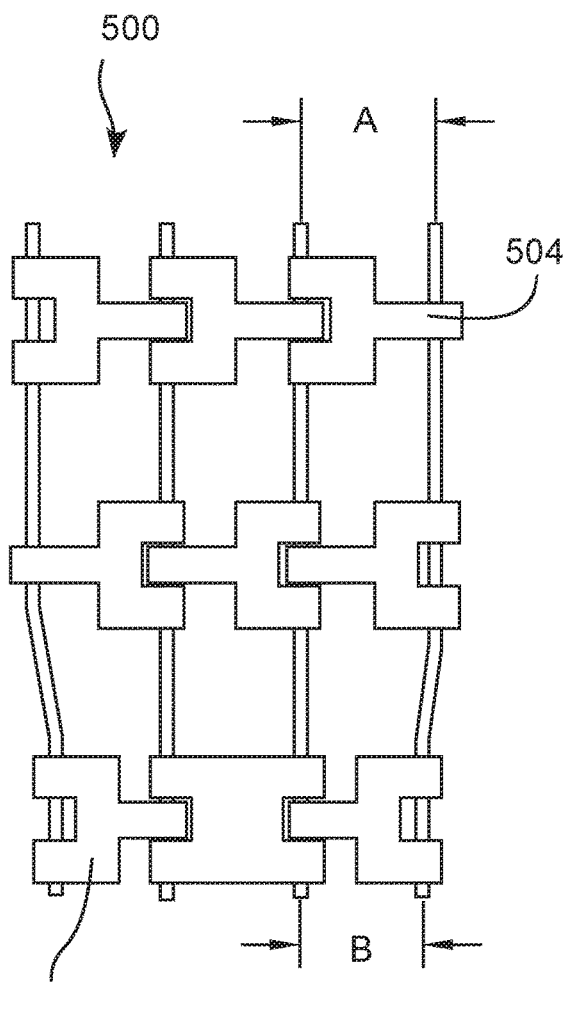
FIG. 17 is a schematic top view of a portion of another embodiment of a net assembly according to the invention.

FIG. 17 schematically shows another embodiment of a net assembly 500. In this assembly, short connectors 502 are introduced which are slightly shorter than the connectors 504 in the remaining net assembly. At a first end of the net assembly the distance between adjacent ropes is shown by the dimension A while at a second end where the shorter connectors 502 are used, the distance between adjacent ropes is shown by the dimension B. By mixing connectors of different lengths, different forms of net assemblies can be provided.

Figure 18:
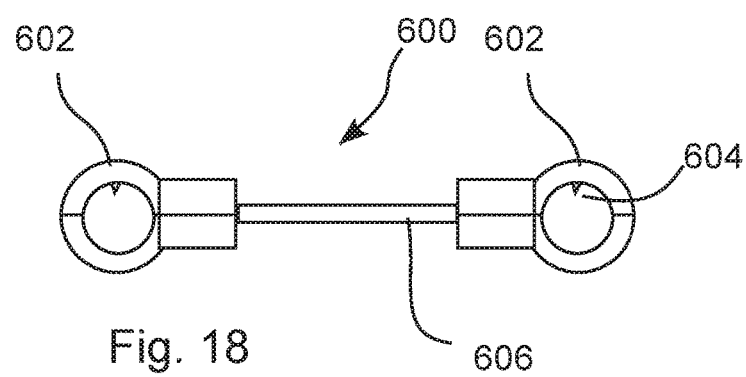
FIG. 18 shows a schematic front view of another embodiment of a connector for a net assembly according to the current invention.

FIG. 18 shows a very schematic embodiment of a connector 600. In this embodiment, both ends 602 of the connector are provided with pins 604 which means that both ends are prevented from displacing and from pivoting with respect to the rope to which they are connected to. However, the portion 606 between the first and second ends is arranged as a flexible element. In this way, the net assembly is still able to be flexible, while the connectors can be placed without putting them in contact with each other, i.e. the first end of a first connector does not have to engage with a second end of a second connector.

The above description and figures have disclosed a number of different embodiments. It should be clear to the person skilled in the art that the different features of the different embodiments can be mixed and matched depending on the desired purpose of the net assembly.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific manufacturing techniques have not been described in detail since it is maintained that the person skilled in the art would be able to find suitable materials and suitable processes to manufacture the net assembly according to the current invention.

The invention claimed is:

1. A net assembly comprising:
   a. a first elongated member,
   b. a second elongated flexible member,
   c. a third elongated flexible member,
   d. a first connector, and
   e. a second connector,
   f. said first connector connecting the first elongated member and second elongated flexible member, g. said second connector connecting the second and third elongated flexible members,
h. said first connector having a first end and a second end, said first end being connected to the first elongated member, said second end being connected to the second elongated flexible member, said first end comprising a first through going hole arranged perpendicular to the longitudinal axis of the connector, said second end comprising a second through going hole arranged perpendicular to the longitudinal axis of the connector and the first and second through going holes being arranged such that the first and second elongated members connected to the first connector pass through the through going holes,
i. said second connector having a first end and a second end, said first end being connected to the second elongated flexible member, the second end being connected to the third elongated flexible member, said first end comprising a first through going hole arranged perpendicular to the longitudinal axis of the connector, said second end comprising a second through going hole arranged perpendicular to the longitudinal axis of the connector and the first and second through going holes being arranged such that the second and third elongated members connected to the second connector pass through the through going holes, and
j. said first and/or said second end of said first and second connectors comprising a longitudinal displacement preventing element which prevents the first and/or the second end of the connector from displacing along the longitudinal axis of the elongated flexible member to which it is connected,
k. said first end and/or said second end of said first connector are/is pivotably connected to the first elongated member and/or the second elongated flexible member respectively,
l. said first end and/or said second end of said second connector are/is pivotably connected to the second and/or the third elongated flexible member respectively, and
m. said first connector comprising a first connector joining element and said second connector comprising a second connector joining element, said first and second connector joining elements being arranged to engage with each other such that the connectors are able to pivot with respect to each other about the longitudinal axis of the elongated flexible member to which they are both connected, but not displace with respect to each other along the longitudinal axis of the elongated flexible member to which they are both connected.

2. The net assembly according to claim 1, wherein the inner diameter of the first and/or second through going holes is slightly larger than the outer diameter of the elongated member.

3. The net assembly according to claim 1, wherein the dimension of the first end of both the first and second connectors in a direction parallel to the longitudinal axis of the elongated flexible member to which it is connected is greater than the corresponding dimension of the second end of the connector and in that the first end of the connector has an opening which is suitable for inserting the second end of another connector.

4. The net assembly according to claim 1, wherein the net assembly further comprises a third and a fourth connector similar to the first and second connectors respectively, said third and fourth connector being spaced from said first and second connector in the direction of the longitudinal axis of the elongated flexible members and being connected to the first elongated member and the second and third elongated flexible members respectively in a manner similar to the first and second connectors.

5. The net assembly according to claim 4, wherein the net assembly comprises an exposed section of elongated member between the first and the third connectors and between the second and the fourth connectors.

6. The net assembly according to claim 1, wherein the longitudinal displacement preventing element of the first and second connectors is a protrusion which is pressed into the elongated flexible member to enhance the friction between the connector and the elongated flexible member to which it is connected.

7. The net assembly according to claim 1, wherein the maximum dimension of the first and second connectors perpendicular to the plane tangent to the net assembly at the location of the connector is less than 200% of the corresponding dimension of the elongated flexible member.

8. The net assembly according to claim 1, wherein the first and second connectors each comprise a bottom shell portion and a top shell portion which are fastened together around the elongated elements to which the respective connector is connected.

9. The net assembly according to claim 8, wherein the top and bottom shell portions are identical half shell elements which are fastened together.

10. A basket swing comprising the net assembly according to claim 1, wherein the basket swing comprises a circular frame and circular flexible elongated elements arranged concentrically and connectors which are arranged in radial directions and which connect the circular frame and the circular flexible elongated elements.

11. A rectangular net assembly comprising the net assembly according to claim 1, wherein the rectangular net assembly comprises flexible elongated elements arranged essentially parallel to each other and connectors arranged perpendicular to the flexible elongated elements and parallel with each other.

12. A method of assembling the net assembly according to claim 1, wherein the method comprises the steps of:
   a. proving a suitable form,
   b. arranging a series of bottom shell portions of a series of connectors in the form,
   c. arranging a series of elongated flexible members on top of the bottom shell portions and in the form,
   d. arranging a series of top shell portions of the series of connectors on top of corresponding bottom shell portions and on top of the elongated flexible members, and
   e. pressing the top shell portions towards the bottom shell portions to join the top and bottom shell portions together to thereby sandwich the elongated flexible members between the top and bottom shell portions of the connectors to form the net assembly.

13. The net assembly according to claim 1, wherein said second elongated flexible member is a rope, a wire or a chain and said third elongated flexible member is a rope, a wire or a chain.

* * * * *